United States Patent [19]

Kamigaito et al.

[11] Patent Number: 4,472,538
[45] Date of Patent: Sep. 18, 1984

[54] COMPOSITE MATERIAL COMPOSED OF CLAY MINERAL AND ORGANIC HIGH POLYMER AND METHOD FOR PRODUCING THE SAME

[75] Inventors: Osami Kamigaito; Yoshiaki Fukushima; Haruo Doi, all of Nagoya, Japan

[73] Assignee: Kabushiki Kaisha Toyota Chuo Kenkyusho, Aichi, Japan

[21] Appl. No.: 318,862

[22] Filed: Nov. 6, 1981

[30] Foreign Application Priority Data

Nov. 26, 1980 [JP] Japan ............................ 55-166980

[51] Int. Cl.³ .......................... C08K 3/10; C08K 3/34
[52] U.S. Cl. .................................. 523/202; 523/203; 523/205; 523/209; 524/445; 524/446; 524/447; 427/204; 427/387; 428/405; 428/407; 428/920; 428/921
[58] Field of Search ............... 428/455, 407, 331, 447, 428/920, 921; 523/202, 203, 209; 524/445, 446, 447; 427/387, 204

[56] References Cited

U.S. PATENT DOCUMENTS

| | | | |
|---|---|---|---|
| 2,859,198 | 11/1958 | Sears | 524/493 |
| 3,236,802 | 2/1966 | Ferrigno | 523/202 |
| 3,328,231 | 6/1967 | Sergovic | 428/451 |
| 3,471,435 | 10/1969 | Miller | 523/203 |
| 4,233,366 | 11/1980 | Sample | 428/405 |
| 4,241,138 | 12/1980 | Chentemirow | 428/407 |
| 4,251,576 | 2/1981 | Osborn | 428/331 |

OTHER PUBLICATIONS

"Silylating Agents", *Kirk-Othmer Encycl. of Chem. Tech.*, vol. 18, 1969, John Wiley & Sons, Inc., pp. 260-267.

24th Clay Science Debate (Japan), Nov. 7-9, 1980, at Gunma University, "Polymerization of Vinyl Compound Between Inorganic Sheet Structured Compound Layers", p. 50, by Kaoru Kawase et al.

*Primary Examiner*—Ellis P. Robinson
*Attorney, Agent, or Firm*—Berman, Aisenberg & Platt

[57] ABSTRACT

A composite material is provided by contacting a clay mineral having laminated aluminum silicate layers with an organic monomer to allow the organic monomer to be adsorbed on or intercalated between the aluminum silicate layers, and contacting the clay mineral with a silane compound having 2 to 4 chlorine atoms to promote polymerization of the organic monomer, thereby forming a composite material composed of a clay mineral having organic high polymer adsorbed thereon or intercalated therebetween. The composite material thus obtained has a strong chemical bond between inorganic clay mineral and organic high polymer.

9 Claims, 4 Drawing Figures

F I G. 1
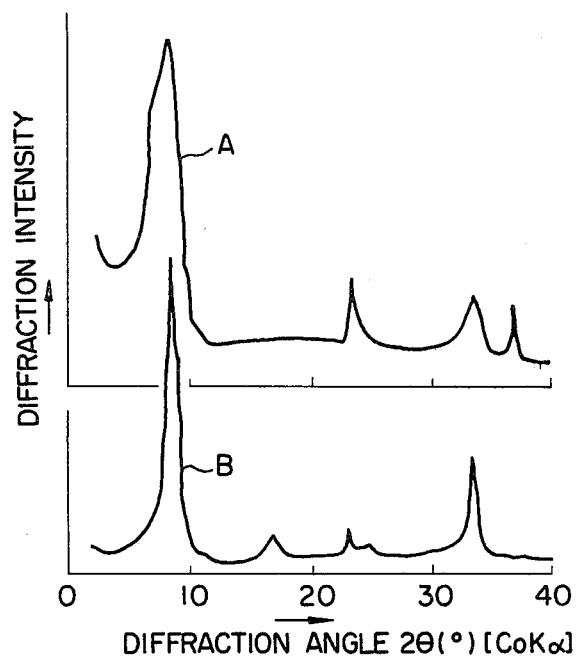
F I G. 2
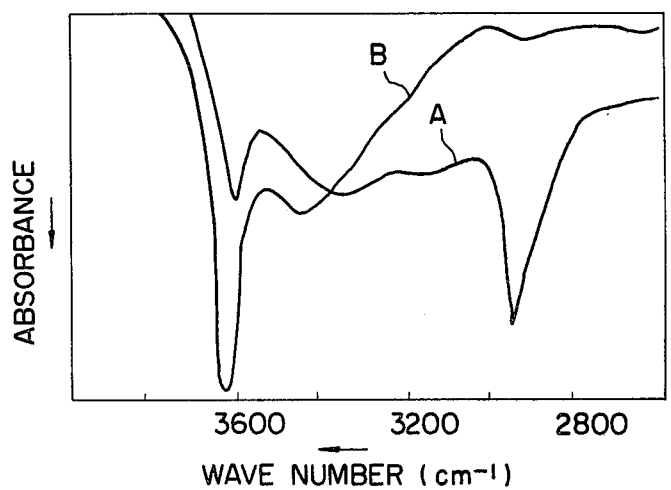

F I G. 3
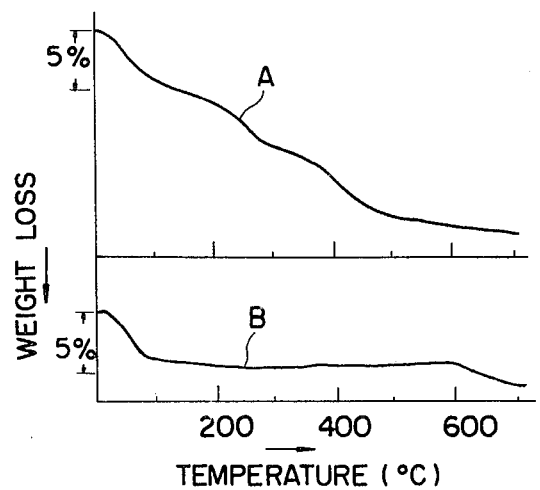
F I G. 4
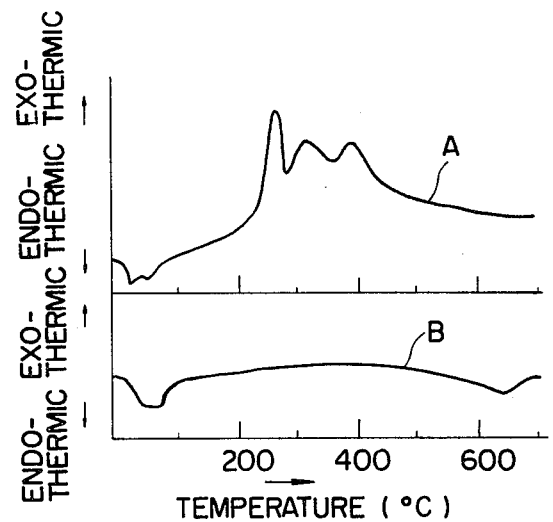

COMPOSITE MATERIAL COMPOSED OF CLAY MINERAL AND ORGANIC HIGH POLYMER AND METHOD FOR PRODUCING THE SAME

BACKGROUND OF THE INVENTION

1. Field of the Invention

The present invention relates to a composite material composed of a clay mineral and an organic high polymer.

2. Description of the Prior Art

Recently, an attempt was made to use inorganic fillers, such as clay minerals or the like, for improving mechanical properties of organic high polymer materials. The use of these inorganic fillers, however, raised many problems, such as increased brittleness due to insufficient bonding between the filler and the organic high polymer substrate. Also, there is a limit in the amount of added filler. Fillers have been pretreated with a silane coupling agent to increase the bond formed between the inorganic filler and the organic high polymer. This can provide a physical bond, but not a sufficiently strong chemical bond, therebetween.

SUMMARY OF THE INVENTION

Accordingly, a primary object of the present invention is to provide a method for producing a composite material having a strong chemical bond between inorganic clay mineral and organic high polymer.

Another object of the present invention is to provide a method for producing a composite material in which organic high polymer is uniformly bound to clay mineral powder to prevent aggregation or flocculation of the clay mineral power, thus providing a uniform dispersion of both materials.

A further object of the present invention is to provide a method for producing a composite material having heat and abrasion resistance and flame retardation.

A still further object of the present invention is to provide a method for producing a composite material having improved mechanical properties.

Another object of the present invention is to provide a composite material composed of clay mineral and organic high polymer in which silane compounds exist therebetween to provide a chemically-strong bond between said clay mineral and said organic high polymer.

Some sheet-structured clay minerals are known which have organic compounds interposed between adjacent layers thereof to form intercalated compounds. There are also known sheet-structured clay minerals in which no intercalated compound is formed, but organic compounds are adsorbed on layer surfaces thereof due to surface activity.

Further, these inorganic compounds contain hydroxyl group (OH) or water ($H_2O$) between layers within their structure, and include absorbed water on their surface. The inventors found that such OH or $H_2O$ reacts with a silane compound, such as dichlorodimethylsilane or the like, to promote polymerization of organic compounds.

The composite material having previously-mentioned advantages (according to the present invention) is obtained by utilizing these properties of clay minerals. Clay mineral having laminated aluminum silicate layers is contacted with organic compound monomer in a liquid, gas or solution state so that the organic compound monomer is adsorbed in the sheet-structured clay mineral, thereby forming adsorbed or intercalated compounds and complexes. If such compounds and complexes are allowed to react with a small amount of silane compound having from 2 to 4 chlorine atoms, polymerization of the organic compound adsorbed or intercalated in clay mineral is promoted due to the interaction between the clay mineral and silane compound. As a result, a composite material composed of clay mineral and organic high polymer is obtained.

The composite material thus obtained is characterized by a strong chemical bond formed between the inorganic and organic materials and by organic high polymer materials uniformly bound with clay mineral powder to prevent aggregation or flocculation of the clay mineral powder and to enable uniform dispersion of both materials.

BRIEF DESCRIPTION OF THE DRAWINGS

Various other objects, features and advantages of the present invention are apparent from the following detailed description when considered in connection with the accompanying drawings, in which:

FIG. 1 is a diagram of X-ray diffraction intensity versus diffraction angle for EXAMPLE 1 using $CoK\alpha$;

FIG. 2 is a diagram of infrared absorption spectrum representing the relation between the absorbance and the wave number of the composite material;

FIG. 3 is a thermogravimetric diagram representing the relation between the temperature and the weight loss of the composite material; and FIG. 4 is a diagram of differential thermal absorption representing the relation between the exothermic or endothermic reaction and the temperature of the composite material.

DETAILED DESCRIPTION

Sheet structured clay minerals to be employed in the present invention include natural and artificial minerals, such as montmorillonite, Na-taeniolite, vermiculite, Japanese acid clay, kaolin, talc, mica, sepiolite and the like. It is known that montmorillonite, Na-taeniolite, vermiculite and the like, among these minerals, form adsorbed or intercalated compounds. The composite material according to the present invention is obtained by utilizing such adsorbed or intercalated compounds. Organic high polymers in the present invention include, e.g., vinyl polymers, such as polystyrene, polyisoprene, polyvinyl acetate or the like, and polyamide compounds, such as nylon 6, obtained by ring-opening polymerization.

A silane compound to be employed in the present invention is a compound represented by the general formula: $R_{(4-n)}Cl_n.Si$, in which R stands for one of —H, —$CH_3$, —$C_6H_5$, —CH=$CH_2$, —$OCH_3$, and n stands for one of 2, 3 and 4. The compounds are, for example, $SiCl_4$, $SiHCl_3$, $SiH_2Cl_2$, $(CH_3)_2SiCl_2$, $CH_3SiCl_3$, etc.

The composite material according to the present invention, is, e.g., subjected to hot pressing or, after being mixed with an organic high polymer, to injection molding, or the like, thus forming a desired product. Such product includes, e.g., from 0.5 to 98% by weight of an inorganic clay mineral. The product with relatively small organic content has high resistance to heat and abrasion, as well as high flame retardation. The product with relatively small inorganic content has high mechanical properties.

Examples describing the preparation of the composite material in accordance with the present invention follow.

EXAMPLE 1

Clay mineral and vinyl organic compound monomer were employed in combination, as shown by a circle in TABLE 1, to form adsorbed or intercalated compounds and complexes. About 50 g of organic compound monomer were added to about 200 g of clay mineral at room temperature.

TABLE 1

|  | styrene | isoprene | vinyl acetate |
| --- | --- | --- | --- |
| montmorillonite | O | O | O |
| vermiculite | O | X | X |
| Na-taeniolite | O | X | X |
| kaolin | O | X | X |
| Japanese acid clay | O | X | X |

From the fact that the distance between layers in montmorillonite, vermiculite and Na-taeniolite increased from 12 or 13 Å to about 15 Å, it was confirmed that intercalated compounds were formed in these materials. It was also found that the adsorption or intercalation of the organic materials by the inorganic materials occurred within a very short period of time. Then, each combination shown in TABLE 1 was admixed with 5 cc of dichlorodimethylsilane and kept at room temperature. This caused polymerization of the organic compound, thereby forming composite material composed of a clay mineral and an organic high polymer. The polymerization proceeded relatively fast so that in the case of styrene, for example, polymerization to a solid state occurred in only a few minutes. The formation of an organic high polymer (due to polymerization) was confirmed through infrared absorption spectrum measurement. It was further confirmed that montmorillonite, vermiculite and Na-taeniolite still had a distance of more than about 15 Å between layers after polymerization thus forming intercalated compounds composed of clay mineral and organic high polymer.

It was apparent from a thermogravimetric measurement that each composite material contained from 5 to 20% by weight of an organic high polymer.

FIGS. 1 to 4 show measurements of composite material composed of montmorillonite as a clay mineral and polyisoprene as an organic high polymer obtained according to this Example (curve A). For comparison, curve B in each Figure represents measurements of composite material composed of montmorillonite and isoprene not subjected to polymerization, i.e. not admixed with dichlorodimethylsilane.

FIG. 1 is a diagram obtained by X-ray diffraction using a CoKα-ray. It is apparent from FIG. 1 that the full width at half maximum of the montmorillonite (001) layer at the diffraction angle (2θ) of about 8 is different for curves A and B. This is probably due to the fact that, in the composite material shown by curve A, montmorillonite had, in part, an enlarged distance between layers of about 15 Å and the full width at half maximum of the diffraction peak of the (001) layer was increased, as shown by curve A. The curve shown by B was the same as that of montmorillonite alone. This is probably due to dispersion of isoprene in the composite material composed of montmorillonite and isoprene (not subjected to polymerization) when the sample for X-ray diffraction was prepared.

FIG. 2 is a diagram of infrared absorption spectrum, in which the absorption of an organic material is found at about 2950 $cm^{-1}$ (wave number) as shown by curve A. On the other hand, curve B shows no absorption of isoprene or its polymer, probably because isoprene dispersed when the sample was prepared. It is thought that, in curve B, the absorption at about 3620 $cm^{-1}$ is that of hydroxyl group in water adsorbed by montmorillonite.

FIG. 3 is a thermogravimetric diagram. In curve A, the weight loss at a temperature not more than 100° C. and at 200° C. to 500° C. is remarkable. The weight loss at a temperature not more than 100° C. is deemed to have been caused by the dispersion of adsorbed water, while that at 200° C. to 500° C., by the decomposition of the organic high polymer. In curve B remarkable weight loss is found at a temperature not more than 100° C., probably because of dispersion of absorbed water. The weight loss is hardly found at 100° C. to 600° C. because there is no organic high polymer obtained. Namely, curve B is the same as that of montmorillonite alone.

FIG. 4 is a diagram showing differential thermal absorption. The peak at from 250° C. to 400° C. shown by curve A represents the exothermic reaction caused by combustion of the organic high polymer.

Among the composite materials thus obtained, the composite material composed of 85% by weight of montmorillonite and 15% by weight of polystyrene and silanol was compressed by hot pressing under a pressure of 500 $kg/cm^2$ at 150° C., whereby a molded product was obtained. The molded product showed mechanical properties similar to or better than a molded product of mere polystyrene. It had a bending strength of 500 $kg/cm^2$ and a modulus of elasticity (in bending) of $5.0 \times 10^4 \, kg/cm^2$. The thermal deformation temperature of this molded product was greatly improved, as compared with a conventional molded product of mere polystyrene; it was more than 130° C. under a load of 18.5 $kg/cm^2$.

EXAMPLE 2

Thirty grams of a commercially available montmorillonite powder was dispersed in one liter of water by a mixer to prepare a montmorillonite suspension. After 20 g of ε-caprolactam was added to this suspension, 50 cc of dichlorodimethylsilane was further added, thus forming an intercalated compound of montmorillonite, ε-caprolactam and silanol. The formation of the intercalated compound was confirmed through X-ray diffraction, infrared absorption spectrum and differential thermal analysis, or the like. X-ray diffraction and infrared absorption spectra confirmed that this intercalated compound was formed into an intercalated compound composed of montmorillonite and nylon 6 when it was heated at about 200° C. for one hour in air to effect polymerization of ε-caprolactam between the layers.

An aqueous suspension of the intercalated compound composed of montmorillonite, ε-caprolactam and silanol (obtained by the aforementioned method) was admixed with a formic acid having 50 g of nylon 66 dissolved therein, then filtered by means of suction and dried at 80° C. for 72 hours. As a result, powder of an intercalated compound covered with nylon 66 was obtained. The powder was then heated at 200° C. for one hour to obtain a powder of composite material (I) formed of: (the intercalated compound composed of montmorillonite and nylon 6)+nylon 66. The powder thus obtained contained about 10% of organic constituents.

The powder was then mixed with nylon 66 pellets by using a twin screw extruder so as to obtain pellets containing 40% by weight of the powder relative to nylon 66. The extrusion was performed at a rotation of 600 rpm and at a temperature of 260° to 300° C. Then, samples were prepared from these pellets by use of an injection molding machine. Injection molding was performed under an injection pressure of 600 to 800 kg/cm$^2$, at a temperature of 230° to 300° C. and with a mold temperature of 80° C.

The resultant product composed of the composite material (I) and nylon 66 thus obtained had mechanical properties which were greatly improved over those of nylon 66. It had a modulus of elasticity in bending of 900 kg/mm$^2$ and a bending strength of 17.0 kg/mm$^2$. Moreover, the product had an elongation in bending of about 10%, thus showing a remarkable improvement in brittleness, as compared with nylon 66 merely admixed with a similar amount of untreated montmorillonite (having an elongation of 2%) or montmorillonite treated with silane (having an elongation of 4%). Further, the product had excellent heat resistance; it maintained a strength (tensile strength: 7 kg/mm$^2$), even at 90° C., i.e. at a temperature higher by about 60° C., similar to that (at 30° C.) of nylon 66 not admixed with the composite material (I). The product also had greatly improved waterproof properties, namely: it had less water absorption and it showed higher strength for the same water absorption as plain nylon 66.

What is claimed is:

1. A method for producing a composite material having high heat and abrasion resistance, high flame retardation and improved mechanical properties comprising the steps of
    contacting clay mineral (having laminated aluminum silicate layers and containing water on and between said layers) with a polymerizable organic monomer in a liquid, gas or solution state to allow said organic monomer to be adsorbed on and intercalated between said aluminum silicate layers, and
    contacting said clay mineral with a silane compound represented by the formula $R_{(4-n)}Cl_n \cdot Si$ (in which R stands for one of —H, —CH$_3$, —C$_6$H$_5$, —CH=CH$_2$ and —OCH$_3$, and n stands for one of 2, 3 and 4) to promote polymerization of said organic monomer,
    thereby forming a composite material composed of clay mineral having organic high polymer adsorbed thereon and intercalated and uniformly and chemically strongly combined therewith.

2. A method according to claim 1 for producing a composite material and wherein said clay mineral is a member selected from the group consisting of montmorillonite, vermiculite, kaolin, Japanese acid clay, sepiolite and a mixture thereof.

3. A method according to claim 1 for producing a composite material and wherein said organic monomer is a vinyl monomer.

4. A method according to claim 1 for producing a composite material and wherein said organic monomer is a member selected from the group consisting of styrene, isoprene and vinyl acetate.

5. A method according to claim 1 for producing a composite material and wherein said organic monomer is a cyclic amide compound.

6. A method according to claim 1 for producing a composite material and wherein said silane compound is a member selected from the group consisting of SiCl$_4$, SiHCl$_3$, SiH$_2$Cl$_2$, (CH$_3$)$_2$SiCl$_2$ and CH$_3$SiCl$_3$.

7. A method according to claim 1 for producing a composite material and which further comprises the step of coating the resultant material with nylon 66.

8. A method according to claim 7 for producing a composite material and wherein said clay mineral is montmorillonite, said organic monomer is ε-caprolactam and the resulting coated material is heated at 200° C. for one hour.

9. A method for producing a composite material having high heat and abrasion resistance, high flame retardation and improved mechanical properties consisting essentially of
    contacting clay mineral (having laminated aluminum silicate layers and containing water on and between said layers) with a polymerizable organic monomer in a liquid, gas or solution state to allow said organic monomer to be adsorbed on and intercalated between said aluminum silicate layers, and
    contacting said clay mineral with a silane compound represented by the formula $R_{(4-n)}Cl_n \cdot Si$ (in which R stands for one of —H, —CH$_3$, —C$_6$H$_5$, —CH=CH$_2$ and —OCH$_3$, and n stands for one of 2, 3 and 4) to promote polymerization of said organic monomer,
    thereby forming a composite material composed of clay mineral having organic high polymer adsorbed thereon and intercalated and uniformly and chemically strongly combined therewith.

* * * * *